United States Patent
Agarwal et al.

(10) Patent No.: US 6,816,853 B1
(45) Date of Patent: Nov. 9, 2004

(54) METHOD AND SYSTEM FOR EFFICIENTLY EVALUATING A QUERY AGAINST PARTITIONED DATA

(75) Inventors: Nipun Agarwal, Santa Clara, CA (US); Ravi Murthy, Hayward, CA (US); Jagannathan Srinivasan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 505 days.

(21) Appl. No.: 09/872,887

(22) Filed: May 31, 2001

Related U.S. Application Data (63) Continuation-in-part of application No. 09/436,046, filed on Nov. 8, 1999.

(51) Int. Cl.[7] ............................................. G06F 17/30
(52) U.S. Cl. .................. 707/3; 707/2; 707/6; 707/102; 707/103 R
(58) Field of Search ............................... 707/1, 2, 3, 6, 707/104.1, 102, 103 R (56) References Cited

U.S. PATENT DOCUMENTS

| | | |
|---|---|---|
| 4,202,041 A | 5/1980 | Kaplow et al. |
| 4,692,858 A | 9/1987 | Redford et al. |
| 5,167,016 A | 11/1992 | Bagley et al. |
| 5,767,854 A | 6/1998 | Anwar |
| 5,809,212 A | 9/1998 | Shasha |
| 5,809,501 A | 9/1998 | Noven |
| 5,845,129 A | 12/1998 | Wendorf et al. |
| 5,942,741 A | 8/1999 | Longacre, Jr. et al. |
| 5,960,427 A | 9/1999 | Goel et al. |
| 6,061,678 A | 5/2000 | Klein et al. |
| 6,070,169 A | 5/2000 | Shorter |
| 6,154,742 A | 11/2000 | Herriot |
| 6,285,996 B1 | 9/2001 | Jou et al. |

*Primary Examiner*—Jean R. Homere
*Assistant Examiner*—Leslie Wong
(74) *Attorney, Agent, or Firm*—Bingham McCutchen LLP (57) ABSTRACT

A method and mechanism to execute a query against a partitioned database object. Data processed or created for an earlier partition is maintained even after further processing is performed against a subsequent partition. A shared data object, such as a context object, is maintained to store data from processing the partitions of a partitioned table. Rather than discarding or overwriting the shared data object after processing each partition, the data from a subsequent partition is instead appended to the shared data object.

36 Claims, 9 Drawing Sheets

| Userid | Security Clearance | Sex |
|---|---|---|
| A01 | A | M |
| A15 | C | F |

P2

| Userid | Security Clearance | Sex |
|---|---|---|
| B10 | AA | F |
| B20 | A | M |

P3

| Userid | Security Clearance | Sex |
|---|---|---|
| C30 | AA | F |
| C40 | B | M |

METHOD AND SYSTEM FOR EFFICIENTLY EVALUATING A QUERY AGAINST PARTITIONED DATA

CROSS-REFERENCE TO RELATED APPLICATIONS

The present application is a continuation-in-part of U.S. application Ser. No. 09/436,046, entitled "A Mechanism for Sharing Ancillary Data Between a Family of Related Functions," filed on Nov. 8, 1999, issued as U.S. Pat. No. 6,421,666 on Jul. 16, 2002, which is hereby incorporated by reference in it entirety.

BACKGROUND AND SUMMARY

The present invention relates to the field of computer systems. More particularly, the invention relates to a method and system for executing a query involving a partitioned database object.

A "query" is a statement or collection of statements that is used to access a database. Specialized query languages, such as the structured query language ("SQL") are often used to interrogate and access a database. Many types of queries include at least the following. First, the identity of the database object(s) being accessed to execute the query (e.g., one or more named database tables). If the query accesses two or more database objects, what is the link between the objects (e.g., a join condition or column). The typical query also defines selection criteria, which is often referred to as a matching condition, filter, or predicate. Lastly, a query may define which fields in the database object are to be displayed or printed in the result.

A query may seek to access a partitioned database object. Partitioning in a database system generally refers to the process of decomposing an object into a greater number of relatively smaller objects. Smaller objects are often easier to manage and more efficient to search than larger objects. Thus, database systems utilize partitioning to decompose objects such as tables and indexes into smaller and more manageable pieces or "partitions."

One approach to evaluating a query on partitioned data is to treat each partition as a separate schema object. In this approach, some or all of the query is independently evaluated for each partition, and this process is iteratively performed for each partition until the entire query has been evaluated for all partitions to be accessed. Since each partition is independently evaluated, data processed or temporarily created for a first partition may be discarded or overwritten when evaluating a subsequent partition. However, certain categories of queries may require subsequent processing to use data that was created for a prior partition. This may occur, for example, if the query involves a blocking operation, in which no partition can be completely processed until data from all the relevant partitions have been accessed for the blocking operation.

The present invention provides a method and mechanism to execute a query against a partitioned database object, in which data processed or created for an earlier partition is maintained even after further processing is performed against a subsequent partition. In one embodiment of the invention, a shared data object, such as a context object, is maintained to store data from processing the partitions of a partitioned table. Rather than discarding or overwriting the shared data object after processing each partition, the data from a subsequent partition is instead appended to the shared data object. In this manner, data from all relevant partitions exists for later use. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

FIG. 3b shows an example partitioning scheme applied to the database table of FIG. 3a.

FIG. 3c shows an example bitmap index maintained for the database table of FIG. 3a.

DETAILED DESCRIPTION

The invention is described with reference to specific embodiments. It will, however, be evident that various modifications and changes may be made thereto without departing from the broader spirit and scope of the invention. The reader is to understand that the specific ordering and combination of process actions shown in the process flow diagrams and system components in component diagrams described herein are merely illustrative, and the invention can be performed using different, additional, or different combinations/ordering of process actions and components. For example, the invention is particularly illustrated herein with reference to partitioned database tables, but it is noted that the inventive principles are equally applicable to other types of partitioned database objects. The specification and drawings are, accordingly, to be regarded in an illustrative rather than restrictive sense.

Figure 1:
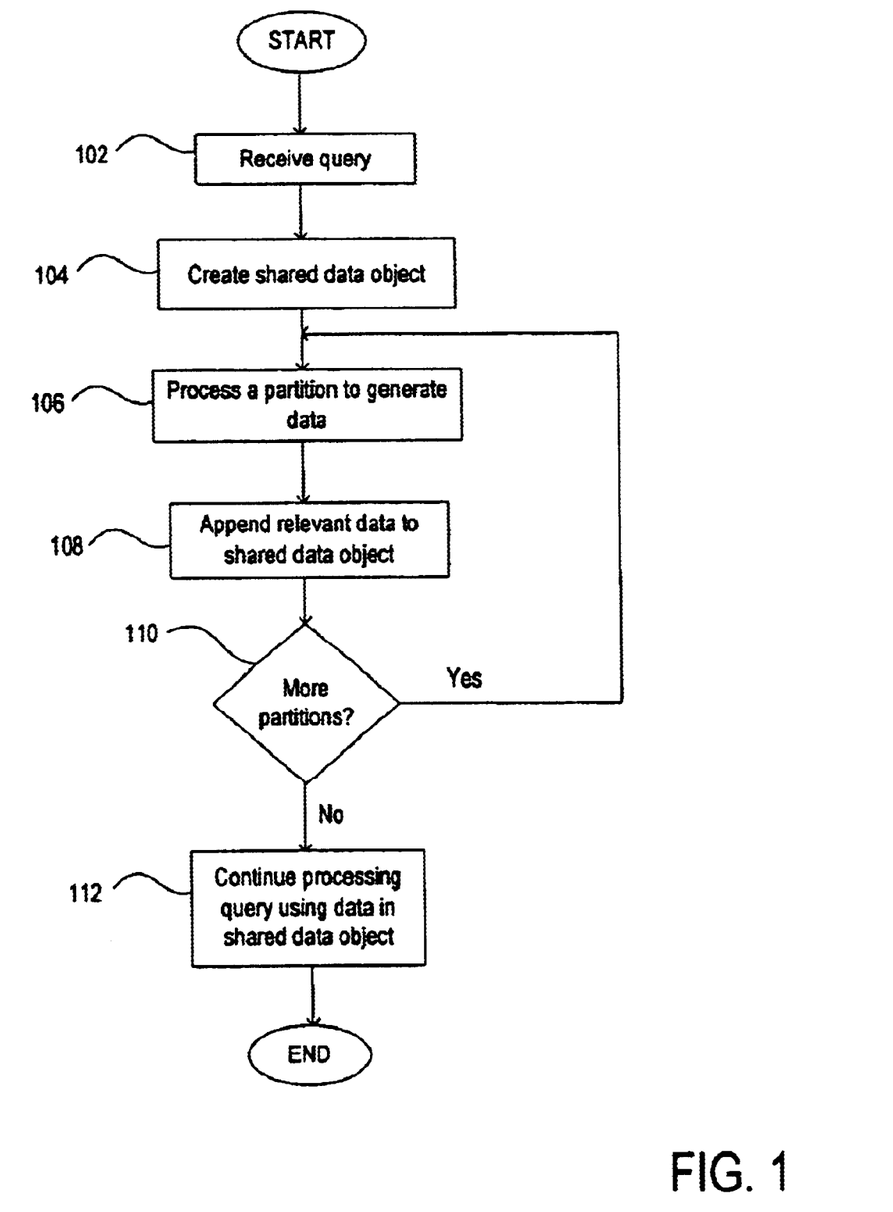
FIG. 1 shows a process for executing a query according to an embodiment of the invention.

FIG. 1 depicts a flowchart of a process for executing a query against a partitioned database table according to an embodiment of the invention. At step 102, an appropriate query is received. According to one embodiment of the invention, the process of FIG. 1 is particularly suitable for queries having the following characteristics: (1) the query is to be evaluated against a partitioned database table; and (2) the query involves an operation for which the data results from processing one or more prior partitions can be advantageously retained for future use. These characteristics exist, for example, in a query against a partitioned database table containing a blocking operation, in which the blocking operation cannot return any response rows until all relevant partitions have been processed. In effect, the output from the query having a blocking operation depends upon results from multiple partitions, and thus the query cannot be entirely done processing a first partition before processing a second partition. This is in contrast to a "pipelined" query in which each partition can be independently processed, where a first partition can be entirely processed before processing a second partition. The blocking operation may require intermediate data that was created during the processing of an earlier partition. By storing the intermediate data for the partitions rather than discarding the intermediate data as the process moves from one partition to the next, that intermediate data can be used to evaluate the blocking operation. Thus, the blocking operation can be evaluated without requiring the costly reprocessing of earlier partitions.

To maintain state between the processing of different partitions, a shared data object is created (104). In one embodiment, a context object is employed as the shared data object. A context object is a named data structure that can be used to store state information. In one embodiment, the shared context is passed as a parameter to a function/operator routine, where the function/operator routine can be configured to write data to the shared context. Different functions and operators can access (i.e., share) the same context object by passing the same context identifier as a parameter to the functions/operators.

While a partition is being processed, intermediate data or state information for that partition is stored in the shared data object (106). In an embodiment, the first partition to be processed provides the first set of data to store in the shared data object. Thereafter, each additional partition that is processed produces additional data that is appended to existing data in the shared data object. As a result, after all the partitions have been processed, data for every processed partition should exist in the shared data object.

In an alternate embodiment, only selected partitions have their data stored in the shared data object for future use. This approach may be used, for example, to ensure that data is not stored for partitions for which it is clear that the partition data is not needed downstream. The query itself, e.g., in the blocking operation call, may contain information that facilitates this identification of unneeded partitions.

After a partition has been processed, a determination is made whether any additional partitions remain to be processed (110). If so, then the process returns back to step 106 for further processing. If not, then the query continues, but the shared data object now contains intermediate data for some or all of the processed partitions (112). The data in the shared data object can be used for downstream query operations. For example, a blocking operation can be evaluated at this step without requiring costly processing to be repeated for each of the earlier partitions that had already been processed, since the data for these partitions is stored and accessible in the shared data object.

Figure 2:
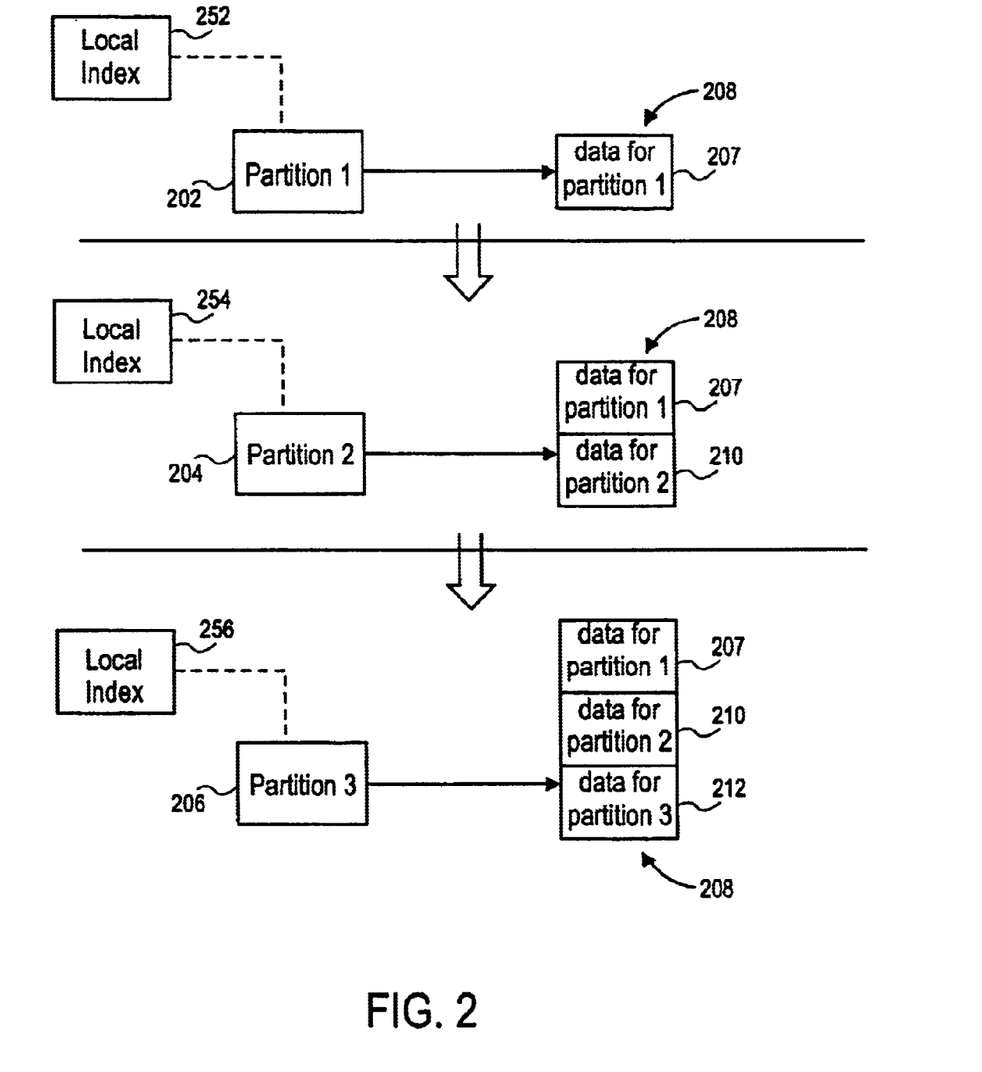
FIG. 2 depicts a process for storing data from processing partitions according to an embodiment of the invention.

Consider a query that is executed against a database table having three partitions 202, 204, and 206, in which the query includes a blocking operation. In the traditional approach to executing this type of query, processing of the first partition 202 would result in the creation of temporary state information. This temporary state information is lost when processing begins on the second partition 204. Processing the second partition 204 results in the creation of more temporary state information, which is also lost once processing begins for the third partition 206. Once the third partition has been processed, only the temporary state information for the third partition remains to be used by the blocking operation. If the locking operation requires data that once existed in the temporary state information for either first partition 202 or second partition 204, then this procedure is relatively inefficient, since the processing for the first and second partitions may have to be repeated to reproduce state information that is needed to evaluate the blocking operation.

FIG. 2 represents the evaluation of a query and maintenance of a shared data object according to one embodiment of the invention. A context object 208 is created to store intermediate data and/or state information from processing partitions 202, 204, and 206. While processing a first partition 202, intermediate data 207 is stored in the shared context object 208. When processing of the first partition is done, the information loaded into the shared context object 208 is not discarded. When the second partition 204 is processed, intermediate data 210 from the second partition 204 is appended to the data 207 already existing in the shared context object 208, rather than overwriting data in the shared context object 208. When the third partition 206 is processed, the intermediate data 212 from the third partition 206 is appended to data 207 and data 210 already existing in the shared context object 208.

ILLUSTRATIVE EXAMPLE

The present invention can be applied to database systems that employ user-defined indexes and ancillary operators. A user-defined index is an index whose structure is not native to the system and which can be defined by a user. It often involves index types and index access routines that are defined by an index definer or application creator. In one approach to implementing user-defined indexes, data that identifies access routines for the user-defined indexes are registered with a database system. In response to relevant statements issued by the database system, the registered routines are called to create or access an index structure relating to the data corresponding to the user-defined index. More information regarding an implementation of user-defined indexes is described in more detail in U.S. Pat. No. 5,893,104, entitled "Extensible Indexing," issued on Apr. 6, 1999, which is hereby incorporated by reference in its entirety.

Ancillary operators involve a class of database operators for which data ("ancillary data") may be shared between operations. A context object can be defined to store data from an operator, which is usable by a related ancillary operator to share data within the context object.

Figure 3A:
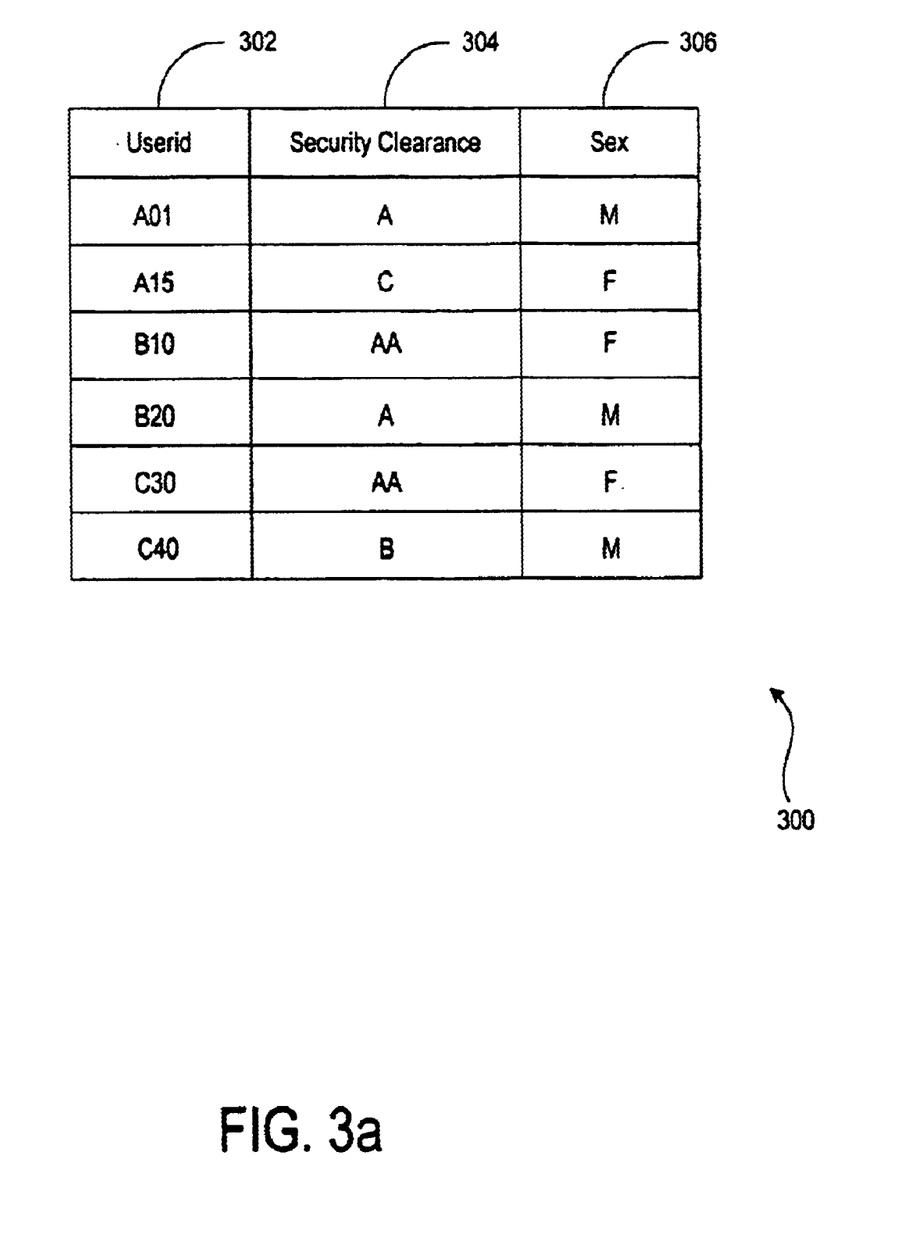
FIG. 3a shows an example database table.

To illustrate the invention, reference is made to the employee table 300 shown in FIG. 3a. Employee table 300 is a database table having a first column 302 to store a userid value for the person associated with a row of data, a second column 304 to store security clearance information, and a third column 306 to store the sex of the person associated with the row of data. Each row in employee table 300 corresponds to a distinct userid value. For many reasons, it may be desirable to decompose employee table 300 into multiple partitions. For example, if employee table 300 contains a very large number of rows, then database maintenance operations may be more efficiently performed if the employee table 300 is stored into multiple, smaller partitions. In addition, if a query seeks information that only exists in a subset of the partitions, then partitioning can be used to improve query performance since partitions not containing information relevant to the query can be pruned from the search.

Figure 3B:
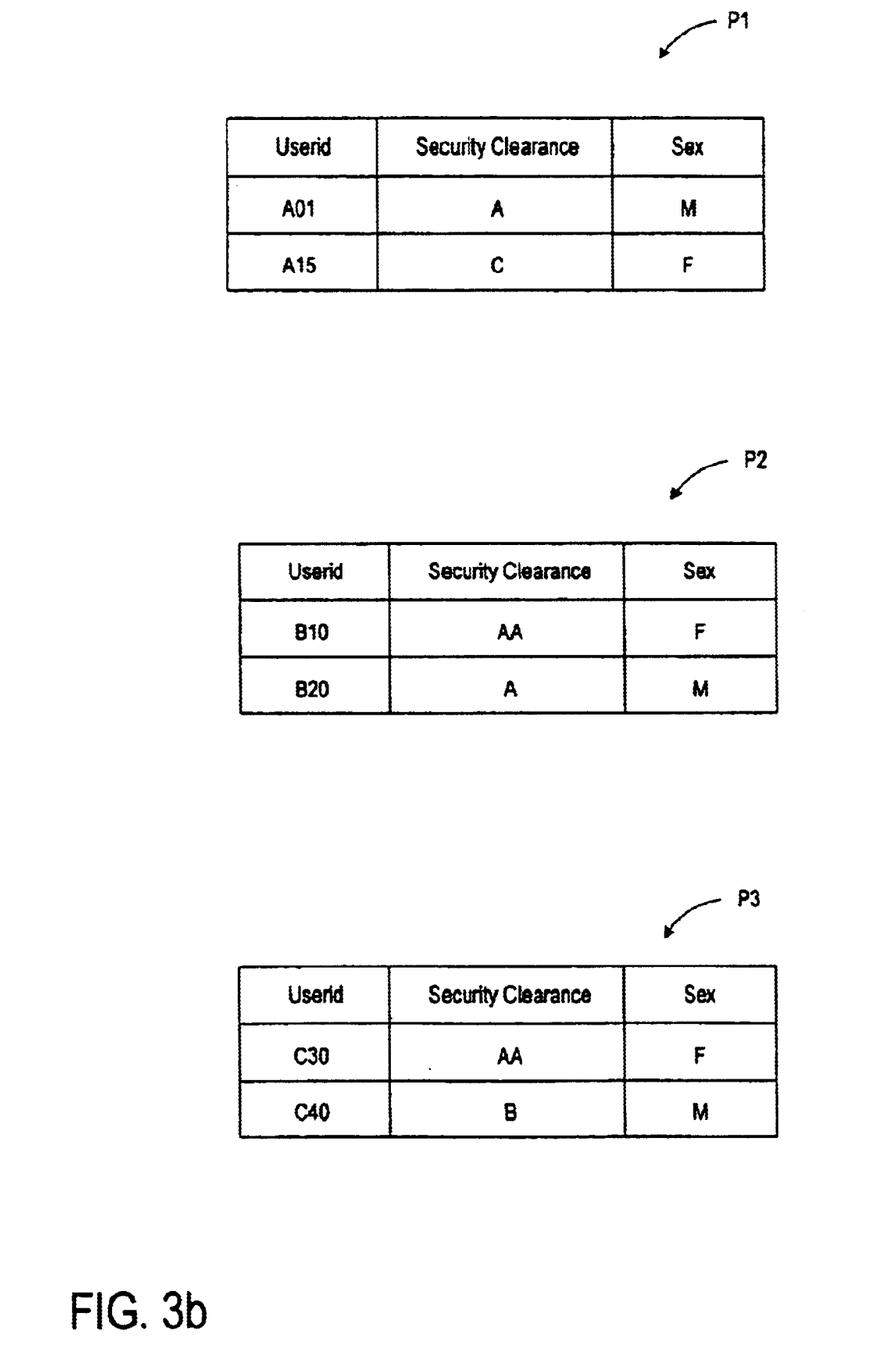

FIG. 3b shows an example partitioning scheme that may be imposed upon the employee table 300 of FIG. 3a. In this partitioning scheme, partitioning criteria is established that separates the data in the employee table 300 based upon the first letter of the userid value for each row. All rows in employee table 300 having a userid value beginning with the letter "A" is stored in a first partition p1. Similarly, all rows in employee table 300 having a userid value beginning with the letter "B" is stored in a second partition p2, and all rows having a userid value beginning with the letter "C" is stored in a third partition p3.

Figure 3C:
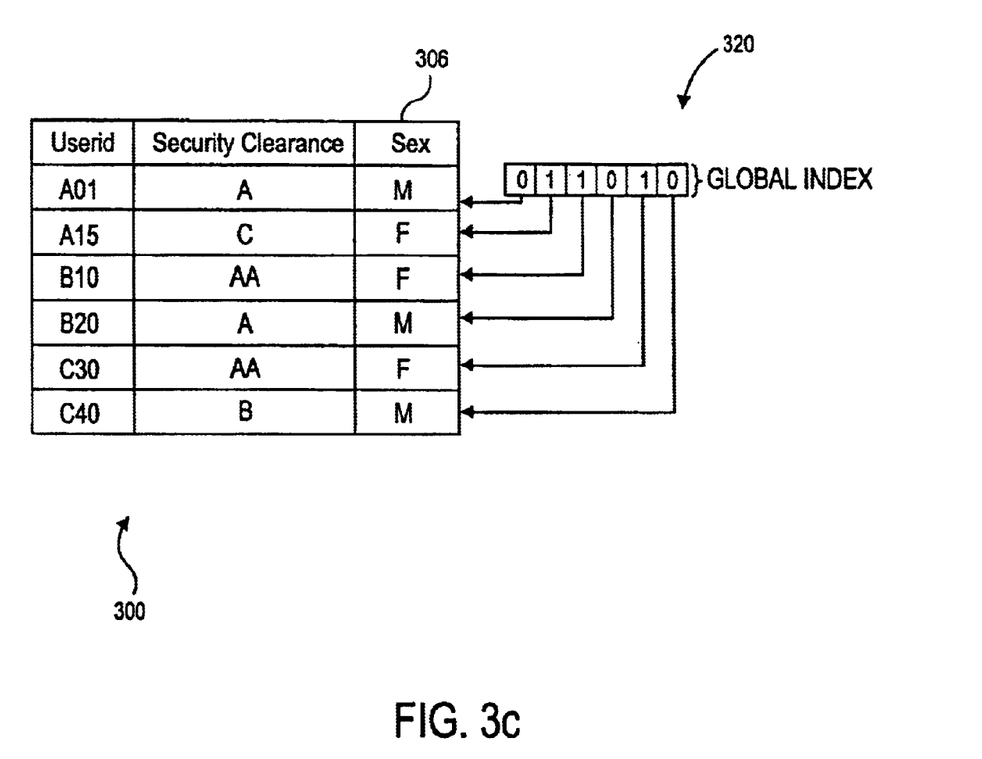

One or more indexes can be maintained for employee table 300. Shown in FIG. 3c is a bitmap index 320 for the sex column 306 that indexes all rows in employee table 300 having the value "F" in the column. Each bit in bitmap index 320 corresponds to a separate row in employee table 300, and each bit value in the bitmap represents a binary state in which the value "1" represents a row having the value "F" in column 306 and the value "0" represents a row having the value "M" in column 306. Additional indexes can be maintained for employee table 300. Each partition p1, p2, and p3 may also be associated with a local index 252, 254, and 256 respectively, e.g., a user-defined index or B-tree index, for rows corresponding to the respective partitions. For example, additional local indexes (not shown) may be maintained for the security_clearance column 304 in employee table 300 based upon a contains( ) operator for values located in that column. In one embodiment, the index 504 which is used to evaluate contains( ) is a local index and the bitmap index 320 on the sex column is a global index. In one embodiment, a local index is a partitioned index that is associated with data in a specific partition. The partitioning criteria for the local index is usually the same as that for its corresponding partitioned table.

Consider if the following query is usually executed against the employee table 300:

SELECT score( )
FROM Employee
WHERE contains (security_clearance, 'A') and sex'F';

For purposes of this example, the contains( ) and the score( ) functions are considered to be related operators that share ancillary data. The contains( ) function is an operator that accepts two parameters O1 and O2 (O1 corresponds to the "security_clearance" column and O2 corresponds to the value 'A'). The contains( ) function returns a True/False flag, referred to as a contains flag, that indicates whether the entity represented by the O1 parameter contains the text of the value of the O2 parameter. In computing the value of the contains flag, intermediate results are created that specifies the number of instances of the O2 value in the O1 entity. The score( ) function is an operator that returns the number of O2 instances that is identified in the O1 entity by the contains( ) function. In this example, the score( ) function is an ancillary operator to the contains( ) function, and therefore the score( ) function may access the same context object accessed by the contains( ) function. Further details regarding an exemplary implementation of the score( ) and contains( ) functions is described in co-pending application Ser. No. 09/436,046, now issued as U.S. Pat. No. 6,421,666, which is incorporated by reference in its entirety.

This query seeks the score for all rows in the employees table that satisfies the contains(security_clearance, 'A') and "sex='F'" predicates. In particular, for every row that includes at least one letter 'A' in the security_clearance column 304 AND the value 'F' in the sex column 306 of employee table 300, the score( ) operator is evaluated to count the number of times the letter 'A' appears in column 304 of those identified rows. Because of the typical table access schemes for this type of query (e.g., using bitmap index 320 to evaluate the sex='F' predicate as well as the other indexes, such as user-defined indexes, to evaluate the contains( ) operator), the score( ) operator is not evaluated for any partition until all partitions have been processed to identify the relevant rows. The join operation 412, i.e., the bitmap AND operation between the bitmap indexes 504 and 406, forms a potential blocking operation that blocks the score( ) function until all the partitions have been accessed. Thus all the rows from the different partitions need to be computed before score( ) can be invoked.

One approach to evaluating the above query against the employee table 300 is to evaluate the contains( ) operator using a user-defined index followed by evaluating the predicate "sex='F'" using the bitmapped index 320. A bit-mapped AND is then performed on the result rows for these evaluations. The score( ) operator is then evaluated as a filter on the resulting rowset. When evaluating the query in this approach, the server evaluates the predicates on each partition independently, and when the server iterates from one partition to the next, all memory and other transient structures are freed, e.g., intermediate results created by the contains( ) operator counting the number of instances of the specified entity for each row is not saved from partition to partition. Thus, the computation performed by the contains( ) operator cannot be shared by the score( ) operator, except for the very last set of data created by the contains( ) operator. However, the intermediate data from each partition is exactly the type of information that is used by the score( ) operator to produce the final rowset. If the information earlier generated by the contains( ) operator for each partition no longer exists, then it must be recreated to evaluate the score( ) operator. This may involve computationally expensive operations to recreate this data.

Figure 4:
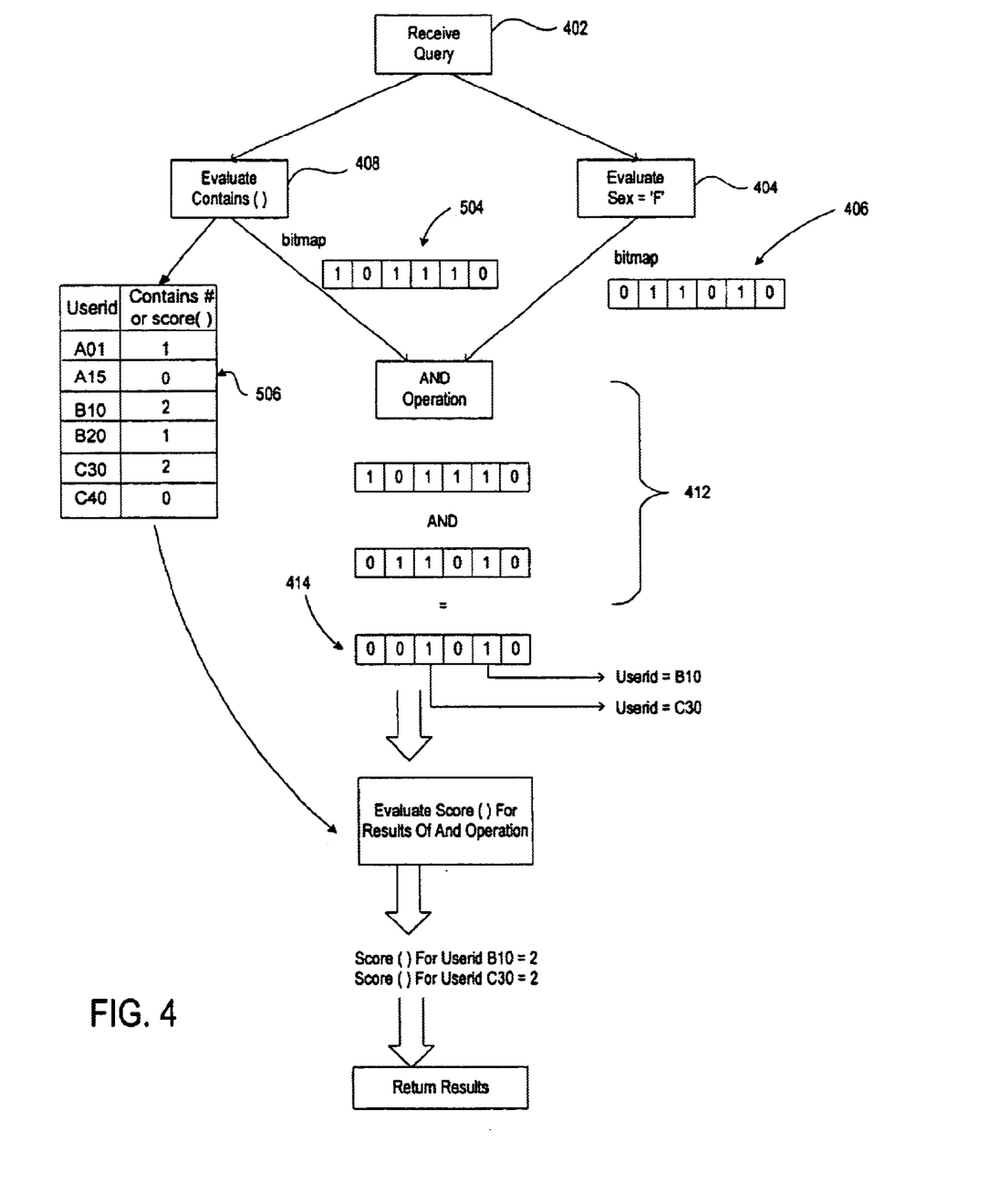
FIG. 4 shows an illustrative use of the invention to execute a query according to one embodiment.

FIG. 4 depicts a process for evaluating the above query according to one embodiment of the invention. At 402, the query is received and evaluated to ensure that it is a suitable query to be processed using the invention. Some of the factors that can be used to evaluate whether the query is appropriate has been set forth above, e.g., whether the query is placed against a partitioned table and whether it involves a blocking operation. The example query corresponds to both of these factors.

The predicate "sex='F'" is evaluated against the employee table 300 to create a bitmap 406 indicating which rows in employee table 300 satisfies the predicate. The bitmap index 320 shown in FIG. 3c can be used to create bitmap 406. Like bitmap index 320, each bit in bitmap 406 corresponds to a separate row in employee table 300, and each bit value in the bitmap 406 represents a binary state in which the value "1" represents a row having the value 'F' in column 306 and the value "0" represents a row having the value 'M' in column 306.

Figure 5:
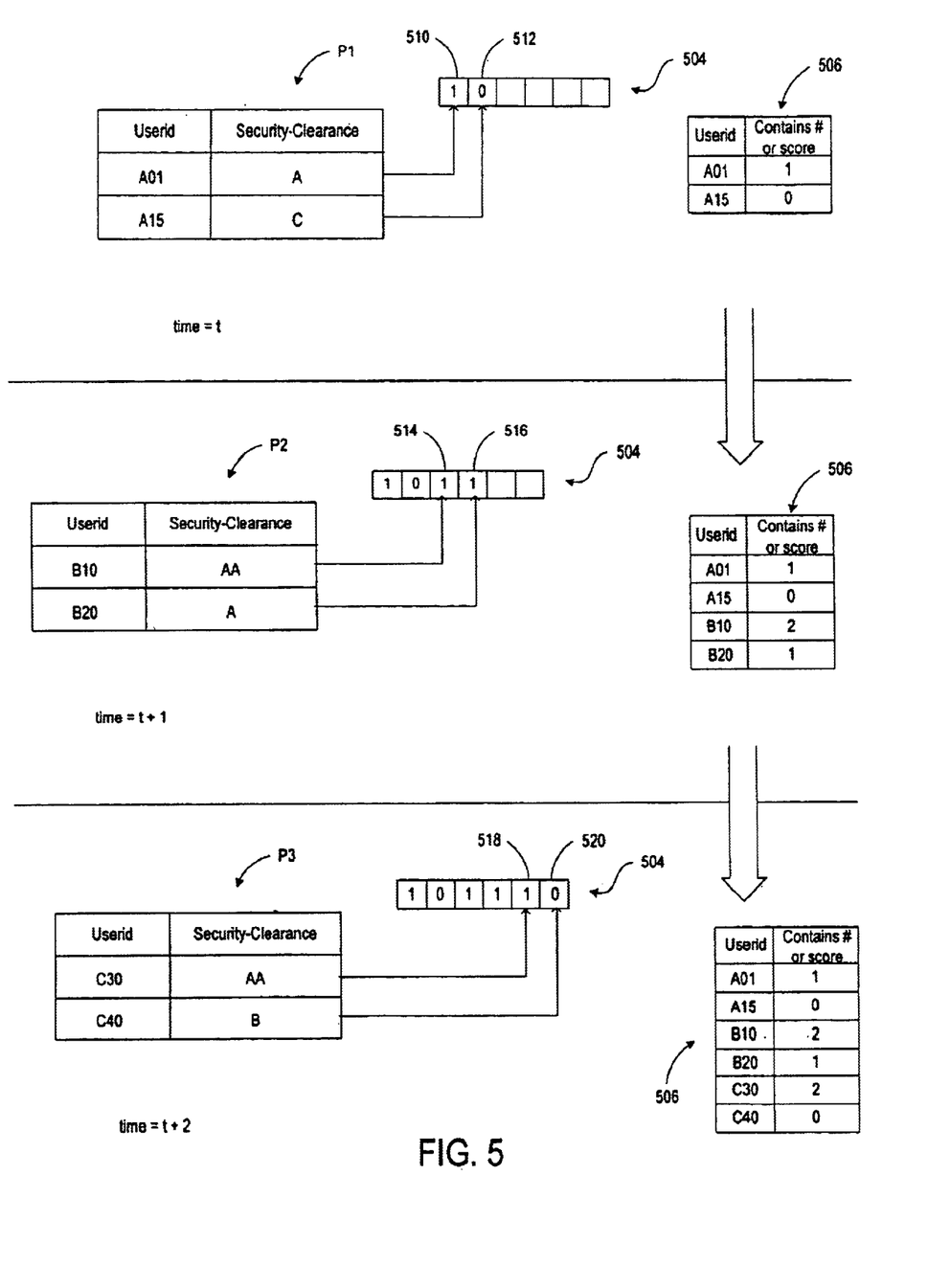
FIG. 5 illustrates storing data in a shared data object according to one embodiment of the invention.

The contains( security_clearance, 'A') operator is also evaluated to create a bitmap 504 indicating which rows in employee table 300 return a TRUE condition for the contains( ) operator. FIG. 5 shows an approach for creating bitmap 504, according to one embodiment of the invention. In the approach of FIG. 5, the contains( ) operator is evaluated on a partition by partition basis, starting with the first partition p1 at time t. The bitmap 504 is created having enough bits to correspond to all rows in the employee table 300. Therefore, bitmap 504 has more bits than the number of rows in partition p1.

Partition p1 has two rows of data, corresponding to userid values of A01 and A15, which are represented in bitmap 504 by bits 510 and 512, respectively. When the contains (security_clearance, 'A') operator is evaluated on these rows for partition p1, each row having at least one 'A' value in the security_clearance column of partition p1 is identified with a "1" value in bitmap 504. Any rows not having at least one 'A' value is identified with a "0" value in its corresponding bit in bitmap 504. Here, the row corresponding to the userid value of A01 includes at least one 'A' entity in the security_clearance column; thus, its corresponding bit 510 in bitmap 504 includes a "1" value. Since the row corresponding to the userid value of A15 does not include any 'A' values in the security_clearance column, its corresponding bit 512 in bitmap 504 includes an "0" value. A local index, e.g., a user-defined index, can be used to evaluate the contains( ) operator on partition p1.

In one embodiment, the contains( ) operator produces intermediate results indicating the number of times the 'A' value appears in the security_clearance for the evaluated rows of partition p1. These intermediate results are stored in a shared context object 506. In particular, the row corresponding to userid A01 is identified in context object 506 as having one instance of the letter 'A' in its security_clearance column. The row corresponding to userid A15 is identified in context object 506 as having zero instances of the letter 'A' in its security_clearance column. After the contains( ) operator has been completely evaluated against partition p1, the contents of shared context object 506 are not flushed or discarded.

At a later time t+1, the contains( ) operator is evaluated against the second partition p2 of employee table 300. Similar to partition p1, partition p2 has two rows of data, corresponding to userid values of B10 and B20, which are represented in bitmap 504 by bits 514 and 516, respectively. When the contains(security_clearance, 'A') operator is evaluated on these rows for partition p2, each row having at least one 'A' value in the security_clearance column of partition p1 is identified with a "1" value in bitmap 504. Any rows not having at least one 'A' value is identified with a "0" value in its corresponding bit in bitmap 504. Here, the row corresponding to the userid value of B 10 includes at least one 'A' entity in the security_clearance column; thus, its corresponding bit 514 in bitmap 504 includes a "1" value. Since the row corresponding to the userid value of B20 also includes ate least one 'A' value in the security_clearance column, its corresponding bit 516 in bitmap 504 also includes a "1" value.

Similar to the processing of the contains( ) operator for partition p1, the contains( ) operator produces intermediate results for partition p2 that indicates the number of times the 'A' value appears in the security_clearance column for this partition. These intermediate results for partition p1 are appended to the intermediate results for partition p2 already stored in a shared context object 506. In particular, intermediate data for the row corresponding to userid B10 is appended to the shared context object 506, in which it identifies this row as having two instances of the letter 'A' in its security_clearance column. The row corresponding to userid B20 is identified in context object 506 as having one instance of the letter 'A' in its security_clearance column. After the contains( ) operator has been completely evaluated against partition p2, the contents of shared context object 506 should contain the intermediate data for both partition p1 and partition p2.

At a subsequent time t+2, the contains( ) operator is evaluated against partition p3. The row in partition p3 having the userid value of C30 corresponds to bit 518 in bitmap 504. Since this row includes at least one instance of the letter 'A' in the security_clearance column, bit 518 is modified to hold the value "1" in bitmap 504. The row in partition p3 having the userid value of C40 corresponds to bit 520 in bitmap 504. Since this row includes no instances of the letter 'A' in the security_clearance column, bit 520 is modified to hold the value "1" in bitmap 504.

Intermediate results from evaluating the contains( ) operator upon partition p3 are appended to existing data in the shared context object 506. In particular, intermediate data for the row corresponding to userid C30 is appended to the shared context object 506, in which it identifies this row as having two instances of the letter 'A' in its security_ clearance column. The row corresponding to userid C40 is identified in context object 506 as having zero instances of the letter 'A' in its security_clearance column. After the contains( ) operator has been completely evaluated against partition p3, the contents of shared context object 506 should contain the intermediate data for partitions p1, p2, and p3.

Referring back to FIG. 4, a bitmapped AND operation is performed between bitmaps 406 and 504 to identify which rows in employee table 300 satisfy both the contains( ) operator and the "sex='F'" predicate (412). The resulting bitmap 414 has a "1" value for each bit for each corresponding row in the employee table 300 that satisfies these conditions. Here, the third and fifth bits in bitmap 414, corresponding to the third and fifth rows in employee table 300, satisfy both conditions. These rows correspond to the userid values of B10 and C30. The score( ) operator is thereafter evaluated against these identified rows to return the final resulting rowset to the user.

The score( ) operator evaluates the number of times the letter 'A' appears in each of these identified rows. As noted above, this information was created as part of the intermediate results from evaluating the contains( ) operator for each partition. Since the intermediate results for the partitions were stored in the shared context object 506, the score( ) operator can be efficiently evaluated by looking up this information for each identified row in the shared context object 506. Note that the performance improvement is significant since the score operator becomes a mere byproduct of the contains( ) evaluation, and hence the computation required by the score( ) operator is drastically reduced compared to the situation if the score( ) operator must be independently re-evaluated for each identified row. Also, since the context object 506 is shared across multiple partitions, it may not need to be initialized for every partition, reducing the expense of setting up and removing of the context object for every partition.

SYSTEM ARCHITECTURE OVERVIEW

Figure 6:
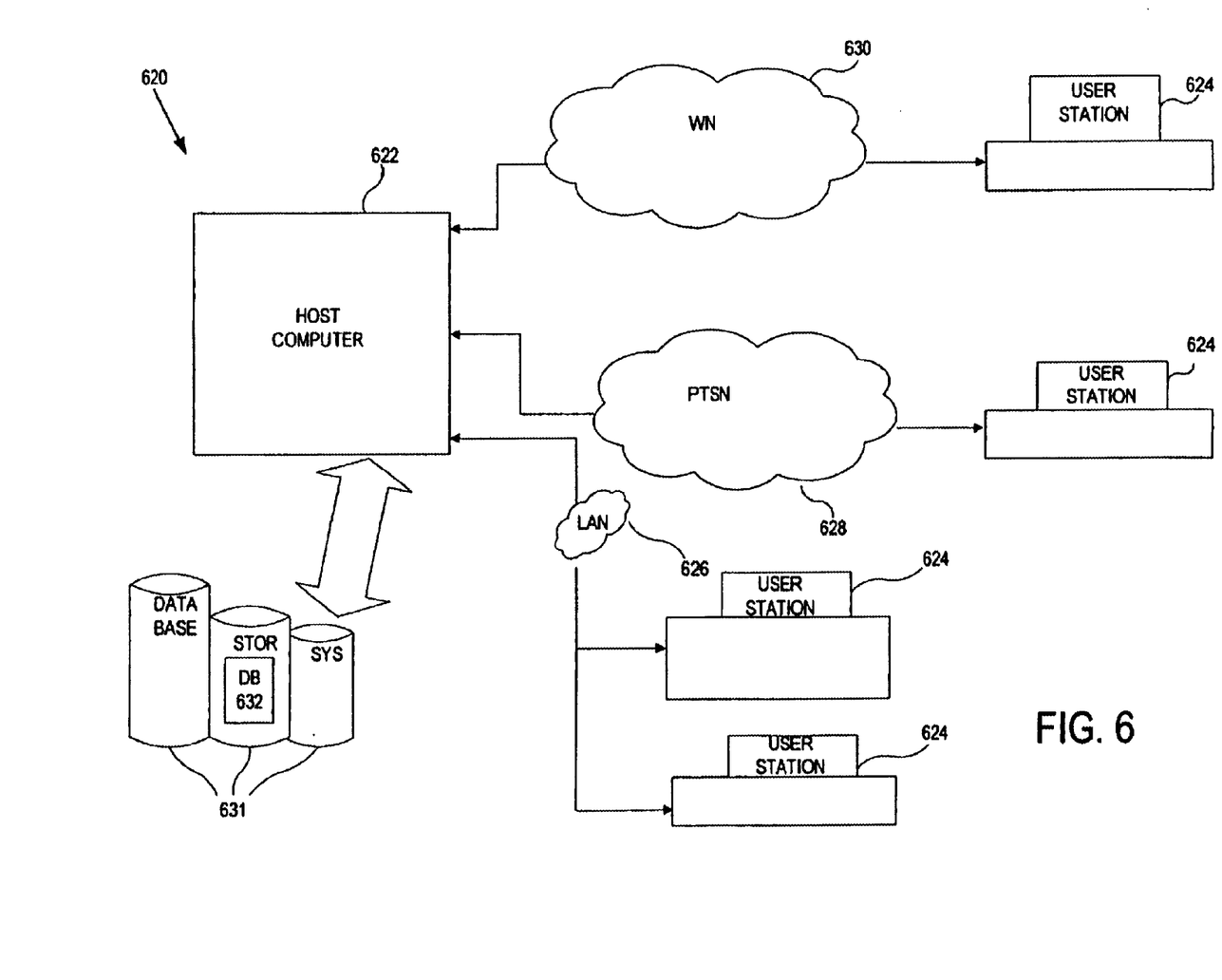
FIGS. 6 and 7 are diagrams of system architectures with which the present invention may be implemented.

Referring to FIG. 6, in an embodiment, a computer system 620 includes a host computer 622 connected to a plurality of individual user stations 624. In an embodiment, the user stations 624 each comprise suitable data terminals, for example, but not limited to, personal computers, portable laptop computers, or personal data assistants ("PDAs"), which can store and independently run one or more applications, i.e., programs. For purposes of illustration, some of the user stations 624 are connected to the host computer 622 via a local area network ("LAN") 626. Other user stations 624 are remotely connected to the host computer 622 via a public telephone switched network ("PTSN") 628 and/or a wireless network 630.

In an embodiment, the host computer 622 operates in conjunction with a data storage system 631, wherein the data storage system 631 contains a database 632 that is readily accessible by the host computer 622. Note that a multiple tier architecture can be employed to connect user stations 624 to a database 632, utilizing for example, a middle application tier (not shown). In alternative embodiments, the database 632 may be resident on the host computer, stored, e.g., in the host computer's ROM, PROM, EPROM, or any other memory chip, and/or its hard disk. In yet alternative embodiments, the database 632 may be read by the host computer 622 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 622 can access two or more databases 632, stored in a variety of mediums, as previously discussed.

Figure 7:
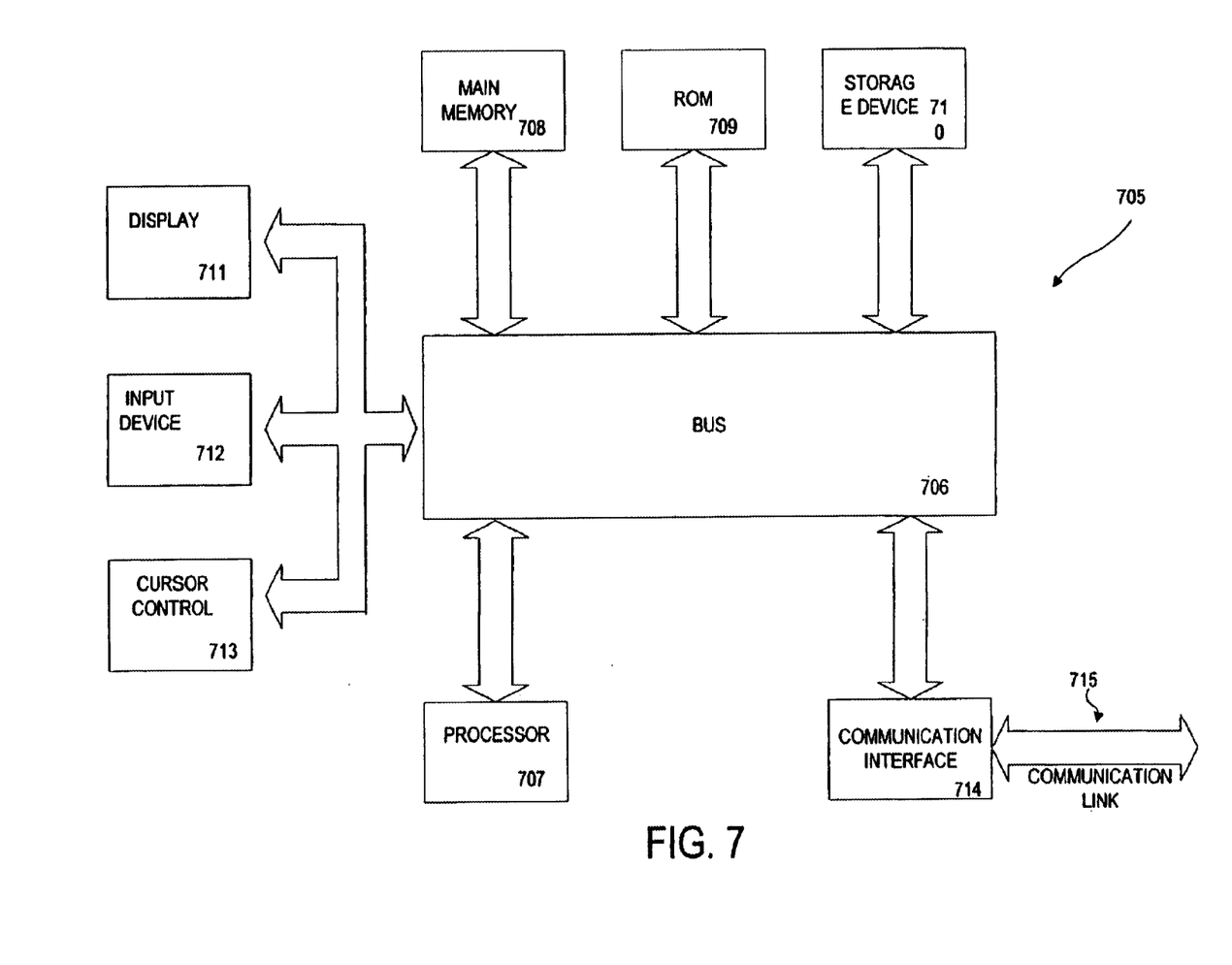

Referring to FIG. 7, in an embodiment, each user station 624 and the host computer 622, each referred to generally as a processing unit, embodies a general architecture 705. A processing unit includes a bus 706 or other communication mechanism for communicating instructions, messages and data, collectively, information, and one or more processors 707 coupled with the bus 706 for processing information. A processing unit also includes a main memory 708, such as a random access memory (RAM) or other dynamic storage device, coupled to the bus 706 for storing dynamic data and instructions to be executed by the processor(s) 707. The main memory 708 also may be used for storing temporary data, i.e., variables, or other intermediate information during execution of instructions by the processor(s) 707. A processing unit may further include a read only memory (ROM) 709 or other static storage device coupled to the bus 706 for storing static data and instructions for the processor(s) 707. A storage device 710, such as a magnetic disk or optical disk, may also be provided and coupled to the bus 706 for storing data and instructions for the processor(s) 707.

A processing unit may be coupled via the bus 706 to a display device 711, such as, but not limited to, a cathode ray tube (CRT), for displaying information to a user. An input device 712, including alphanumeric and other columns, is coupled to the bus 706 for communicating information and command selections to the processor(s) 707. Another type of user input device may include a cursor control 713, such as, but not limited to, a mouse, a trackball, a fingerpad, or cursor direction columns, for communicating direction information and command selections to the processor(s) 707 and for controlling cursor movement on the display 711.

According to one embodiment of the invention, the individual processing units perform specific operations by their respective processor(s) 707 executing one or more sequences of one or more instructions contained in the main memory 708. Such instructions may be read into the main memory 708 from another computer-usable medium, such as the ROM 709 or the storage device 710. Execution of the sequences of instructions contained in the main memory 708 causes the processor(s) 707 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 707. Such a medium may take many forms, including, but not limited to, non-volatile, volatile and transmission media. Non-volatile media, i.e., media that can retain information in the absence of power, includes the ROM 709. Volatile media, i.e., media that can not retain information in the absence of power, includes the main memory 708. Transmission media includes coaxial cables, copper wire and fiber optics, including the wires that comprise the bus 706. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 707 can retrieve information. Various forms of computer-usable media may be involved in providing one or more sequences of one or more instructions to the processor(s) 707 for execution. The instructions received by the main memory 708 may optionally be stored on the storage device 710, either before or after their execution by the processor(s) 707.

Each processing unit may also include a communication interface 714 coupled to the bus 706. The communication interface 714 provides two-way communication between the respective user stations 624 and the host computer 622. The communication interface 714 of a respective processing unit transmits and receives electrical, electromagnetic or optical signals that include data streams representing various types of information, including instructions, messages and data. A communication link 715 links a respective user station 624 and a host computer 622. The communication link 715 may be a LAN 626, in which case the communication interface 714 may be a LAN card. Alternatively, the communication link 715 may be a PTSN 628, in which case the communication interface 714 may be an integrated services digital network (ISDN) card or a modem. Also, as a further alternative, the communication link 715 may be a wireless network 630. A processing unit may transmit and receive messages, data, and instructions, including program, i.e., application, code, through its respective communication link 715 and communication interface 714. Received program code may be executed by the respective processor(s) 707 as it is received, and/or stored in the storage device 710, or other associated non-volatile media, for later execution. In this manner, a processing unit may receive messages, data and/or program code in the form of a carrier wave.

What is claimed is:

1. A method for executing a query against a partitioned database table, the method comprising:

receiving a query directed to a database table, the database table comprising a first partition and a second partition;

processing the query against the first partition to produce first results; wherein the query includes at least a blocking operation;

storing the first results into a shared data object;

processing the query against the second partition to produce second results; and appending the second results into the shared data object.

2. The method of claim 1 further comprising:

accessing the first and second results in the shared data object to further evaluate the query.

3. The method of claim 1 further comprising:

accessing the first and second results in the shared data object to evaluate another operator after a blocking operation in the query.

4. The method of claim 1 in which the shared data object comprises a context object.

5. The method of claim 4 in which an identifier for the shared data object is passed to an operator that processes the first and second partitions.

6. The method of claim 1 in which an ancillary operator in the query processes the first and second partitions.

7. The method of claim 6 in which the ancillary operator shares the shared data object with another operator, the other operator performs a blocking operation.

8. The method of claim 1 in which the first results comprise intermediate data.

9. The method of claim 1 in which the first results comprise final query results.

10. The method of claim 1 in which the steps of processing the query against the first and second partitions comprise accessing a first index that is defined locally and a second index that is defined globally.

11. The method of claim 10 wherein the first index is a user-defined index.

12. The method of claim 10 wherein a join operation forms a blocking operation.

13. The method of claim 10 wherein an AND operation between the first index and the second index forms a blocking operation.

14. A computer program product that includes a medium usable by a processor, the medium comprising a sequence of instructions which, when executed by said processor, causes said processor to execute a process for executing a query against a partitioned database table, the process comprising:

receiving a query directed to a database table, the database table comprising a first partition and a second partition;

processing the query against the first partition to produce first results; wherein the query includes at least a blocking operation;

storing the first results into a shared data object;

processing the query against the second partition to produce second results; and appending the second results into the shared data object.

15. The computer program product of claim 14 further comprising:

accessing the first and second results in the shared data object to further evaluate the query.

16. The computer program product of claim 14 further comprising:

accessing the first and second results in the shared data object to evaluate another operator after a blocking operation in the query.

17. The computer program product of claim 14 in which the shared data object comprises a context object.

18. The computer program product of claim 17 in which an identifier for the shared data object is passed to an operator that processes the first and second partitions.

19. The computer program product of claim 14 in which an ancillary operator in the query processes the first and second partitions.

20. The computer program product of claim 19 in which the ancillary operator shares the shared data object with another operator, the other operator performs a blocking operation.

21. The computer program product of claim 14 in which the first results comprise intermediate data.

22. The computer program product of claim 14 in which the first results comprise final query results.

23. The computer program product of claim 14 in which the steps of processing the query against the first and second partitions comprise accessing a first index that is defined locally and a second index that is defined globally.

24. The computer program product of claim 23 wherein the first index is a user defined index.

25. The computer program product of claim 23 wherein a join operation forms a blocking operation.

26. The computer program product of claim 23 wherein an AND operation between the first index and the second index forms a blocking operation.

27. A system for executing a query against a partitioned database table, the system comprising:

means for receiving a query directed to a database table, the database table comprising a first partition and a second partition;

means for processing the query against the first partition to produce first results; wherein the query includes at least a blocking operation;

means for storing the first results into a shared data object;

means for processing the query against the second partition to produce second results; and means for appending the second results into the shared data object.

28. A method for executing a query against a partitioned database table, the method comprising:

receiving a query directed to a database table, said database table comprising a first partition and a second partition;

processing said query against said first partition to produce a first intermediate data; wherein the query includes at least a blocking operation; and processing said query against said second partition to produce a second intermediate data, wherein said first intermediate data is not lost when processing begins on said second partition.

29. The method of claim 28 further comprising:

accessing said first and second intermediate data to evaluate said query.

30. The method of claim 28 further comprising:

accessing said first and second intermediate data to evaluate another operator after a blocking operation in said query.

31. The method of claim 28 in which an ancillary operator in said query processes said first and second partitions.

32. The method of claim 31 in which said ancillary operator shares said first and second intermediate data with another operator, said other operator performs a blocking operation.

33. The method of claim 28 in which said steps of processing said query against said first and second partitions comprise a first index that is defined locally and a second index that is defined globally.

34. The method of claim 33 wherein said first index is a user-defined index.

35. The method of claim 33 wherein a join operation forms a blocking operation.

36. The method of claim 33 wherein an AND operation between said first index and said second index forms a blocking operation.

* * * * *

UNITED STATES PATENT AND TRADEMARK OFFICE
CERTIFICATE OF CORRECTION

PATENT NO.       : 6,816,853 B1
APPLICATION NO.  : 09/872887
DATED            : November 9, 2004
INVENTOR(S)      : Nipun Agarwal, Ravi Murthy and Jagannathan Srinivasan It is certified that error appears in the above-identified patent and that said Letters Patent is hereby corrected as shown below:

Page 1, item (56) References Cited, US Patent Documents

| | | | | |
|---|---|---|---|---|
| After "5,167,016 A | | 11/1992 | Bagley et al." insert | |
| 5,666,525 | * | 9/1997 | Ross, Kenneth A. | 707/2 |
| After "5,767,854 A | | 6,1998 | Anwar" insert | |
| 5,790,848 | * | 8/1998 | Wlaschin, Scott | 707/201 |
| After "5,942,741 A | | 8/1999 | Longacre, Jr. et al." insert | |
| 5,960,194 A | * | 9/1999 | Choy et al. | 707/102 |
| After "6,070,169 A | | 5/2000 | Shorter" insert | |
| 6,092,061 A | * | 7/2000 | Choy, David Mun-Hien | 707/1 |
| 6,112,198 A | * | 8/2000 | Lohman et al. | 707/3 |
| After "6,285,996 B1 | | 9/2001 | Jou et al." insert | |
| 6,341,289 B1 | * | 1/2002 | Burroughs et al. | 707/104.1 |
| 6,421,666 B1 | * | 7/2002 | Murthy et al. | 707/3 |
| 6,665,684 B2 | * | 12/2003 | Zait et al. | 707/102 |
| 2002/0087531 A1 | * | 7/2002 | Hara et al. | 707/3 |

UNITED STATES PATENT AND TRADEMARK OFFICE
CERTIFICATE OF CORRECTION

| | | |
|---|---|---|
| PATENT NO. | : 6,816,853 B1 | Page 2 of 2 |
| APPLICATION NO. | : 09/872887 | |
| DATED | : November 9, 2004 | |
| INVENTOR(S) | : Nipun Agarwal, Ravi Murthy and Jagannathan Srinivasan | |

It is certified that error appears in the above-identified patent and that said Letters Patent is hereby corrected as shown below:

Page 1, item (56) References Cited, insert

- - OTHER PUBLICATIONS

Bressan et al., the Context Interchange Mediator Prototype, 1997, ACM, Pages 525-527.

Goh et al., context interchange: New Features and Formalisms for the Intelligent Integration of Information, July 1999, ACM, Vol. 17, No. 3, Pages 270-293. - -

Signed and Sealed this

Twenty-second Day of August, 2006

JON W. DUDAS
*Director of the United States Patent and Trademark Office*